United States Patent Office 3,563,653
Patented Feb. 16, 1971

3,563,653
PHOTOMETRIC DETERMINATION OF SPECIFIC SURFACE OF FINELY DIVIDED MATERIAL
Edward C. M. Chen, Houston, Tex., assignor to Ashland Oil, Inc., Houston, Tex., a corporation of Kentucky
Filed May 19, 1969, Ser. No. 825,877
Int. Cl. G01j 3/42; G01n 1/00
U.S. Cl. 356—36                  24 Claims

ABSTRACT OF THE DISCLOSURE

The surface area of finely divided particulate solid matter is obtained by a photometric determination of the amount of a material adsorbed out of a solution by the solid matter.

BACKGROUND OF THE INVENTION

Figures 1, 2:
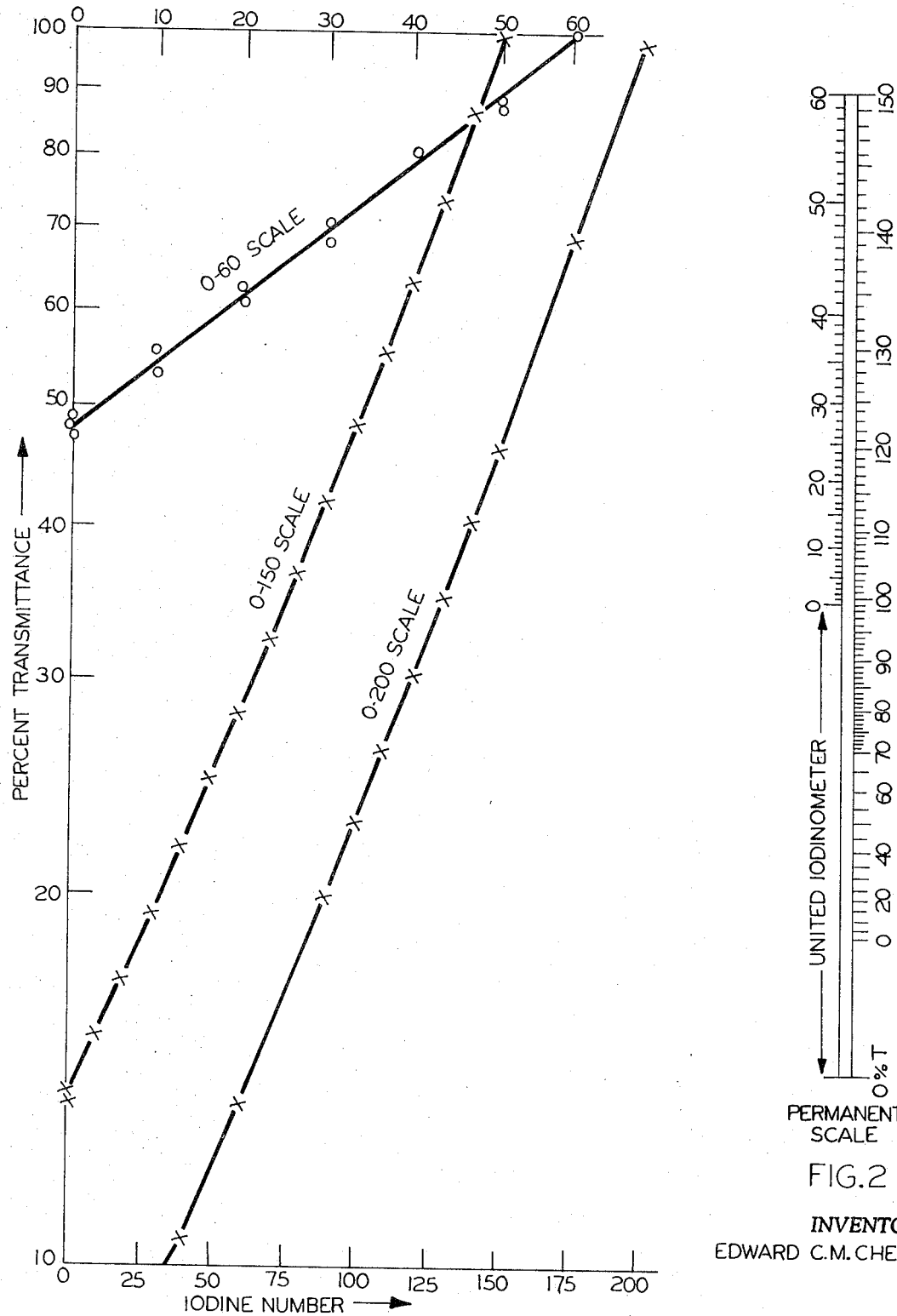

My invention relates to a novel method for determining the surface area of finely divided particulate solid matter.

More particularly it relates to the use of a photometric determination of the amount of a material adsorbed out of a solution by the finely divided particulate solid matter to obtain the surface area.

Surface area means the same as specific surface and is represented by the units of area per weight. Surface area is commonly used in the carbon black industry and other industries.

Various test procedures have been developed to determine the surface area of finely divided particulate solid matter such as adsorbents, catalysts, pigments, fillers, ceramics and the like. Methods such as the BET process have been developed for determining the surface area by calculating the adsorption of noble gases or inert gases onto the finely divided particulate solid matter.

One of the methods for determining the surface area of carbon black is the A.S.T.M. standard iodine number procedure. Under the specified conditions of the A.S.T.M. test, the adsorption of one mg. of iodine corresponds to one square meter of surface.

According to this test, 0.500 g. of pelleted carbon black is weighed out and transferred into an iodine flask. Then 25 ml. of the standard A.S.T.M. iodine solution (57 g. potassium iodide plus 6.00 g. iodine in 1000 ml. water) are added and the mixture is shaken for one minute and centrifuged or filtered through a filter crucible. A sample from the top of the solution is pipetted and titrated with 0.0394 N sodium thiosulfate using a starch indicator. The surface area in square meters or the iodine number is equal to $$300 \times \left(\frac{B-S}{B}\right)$$

where B is the number of milliters of thiosulfate required to titrate 20 mls. of the standard iodine solution and S is the number of milliliters of thiosulfate required to titrate 20 mls. of the iodine solution after adsorption by the carbon black. The surface area of the carbon black is conventionally reported as iodine number. The above procedures are very time consuming and quite involved, requiring a highly skilled operator.

The procedure of my invention has the advantages of being easy, accurate, and quick.

BRIEF DESCRIPTION OF THE INVENTION

The novel process of my invention for determining the surface area of finely divided particulate solid matter comprises mixing a solution of a light-absorbing material with the finely divided particulate solid matter, adsorbing the material onto the particulate solid matter and thereby obtaining a partially depleted soluttion of the light-absorbing material, separating the particulate solid matter having the adsorbed material thereon from the partially depleted solution of the material by filtering through a filter paper which does not appreciably sorb (absorb and/or adsorb) the light-absorbing material from the solution, passing light through the depleted solution into a light intensity determining device, determining the transmittance of light through the depleted solution, and then comparing the transmittance to a standard to obtain the surface area. The light-absorbing material is of course adsorbable by the finely divided particulate solid matter.

It is understood, of course, that the determining of the surface area does not merely mean the determining of an absolute value of surface area, but also includes the determining of whether the surface area is above or below a certain level.

DESCRIPTION OF PREFERRED EMBODIMENTS

The substance which is to have its surface area determined can be any finely-divided particulate solid matter. The use of a finely-divided particulate solid matter which is somewhat reactive with the treating solution is not objectionable per se; however, it may introduce some error into the determination. If such solid matter is used, suitable corrections should be made. Therefore, it is preferred to employ finely divided particulate solids and solutions of adsorbable materials which do not chemically react with one another. Finely divided particulate solid matter such as adsorbents, catalysts, pigments, fillers, ceramics and the like can be used in my novel process. Specifically, my procedure can be used in determining the surface area of carbon blacks, asbestos, silica, diatomaceous earths, and metal oxides. My process can be most advantageously used in the determination of the iodine number of carbon blacks.

The amount of solid matter to be used is limited only to the extent that it does not completely absorb all of the light-absorbing material out of solution.

For extremely accurate results, the finely divided particulate solid matter can be dried in an oven.

The solution used to treat the solid matter can be a solution of any material which is both light-absorbing when in solution, and is adsorbable from solution by the solid matter. The preferred light-absorbing material is iodine.

The amount of light-absorbing material in the solution can vary over a wide range, as long as such amount is in excess of that which will be adsorbed by the solid matter.

When using an aqueous solution to treat the solid matter it is desirable to include significant amounts of a strong electrolyte in the soluton, although it is also contemplated by applicant to use solutions which do not include a strong electrolyte. Suitable electrolytes are the metal halides. The preferred electrolytes are potassium iodide, sodium iodide, and lithium iodide with potassium iodide being the most preferred.

The amount of electrolyte present in the solution is usually between about 10 parts and about 100 parts per 1000 parts of solution. The preferred amount of electrolyte is between about 40 parts and about 60 parts per 1000 parts of solution.

The presence of the strong electrolyte assists somewhat in the retention of the finely divided particulate solid matter on the filter paper.

Whether or not sufficient light-absorbing material is present can easily be ascertained by merely observing if a depleted solution of the light-absorbing material is colored. The light-absorbing material is employed in the form of a solution. The solution which is of particular interest in my novel process is the standard A.S.T.M.

iodine solution (57 g. potassium iodide plus 6.00 g. iodine in 1000 ml. water). Also found suitable in my process are heptane solutions of either methylene blue or of diphenylpicrylhydrazyl.

The mixing step of my procedure can be accomplished by any of the well-known conventional means of bringing two or more substances into intimate contact.

The adsorption of the light-absorbing material onto the finely divided particulate solid matter can be accomplished by any suitable means. The adsorption can be obtained by a slow, hand-swirling of the mixture for about at least 4 minutes. More rapid adsorption can be accomplished by a vigorous shaking by hand (at least about 50 strokes/minute and preferably at least about 120 strokes/minute) of the mixture in a capped bottle. Adsorption by this vigorous shaking takes place in about 2 minutes. For extremely accurate work a mechanical shaker capable of producing from 120 to 240 strokes per minute can be employed.

The separation of the particulate solid matter having the adsorbed material thereon from the partially depleted solution of the adsorbable material is accomplished by filtration. Filter papers formed of wood pulp fibers should not be used for this filtration, since they usually sorb out of solution too much of the adsorbable material, and would therefore introduce considerable error in my process. It is necessary to use only those filter papers which do not appreciably sorb the adsorbable material from the solution. Of particular interest in my process, is glass fiber filter paper. Glass fiber filter paper is commercially available of which Reeves Angel 934 AH is an example. Reeves Angel 934 AH is described in Technical Bulletin 3011 by Reeve Angel and Co., 9 Bridewell Place, Clifton, N.J. and has the following properties:

Color—White
Weight—16 lbs.
Thickness—0.0075 inch
Speed—Rapid
Retention—Excellent The wavelength is chosen so as to take advantage of as much as possible of the scale length on the light intensity determining device being employed. For material of a given average particle size range, selection of a wavelength may be made on the basis of the length of the path traversed by light in the light intensity measuring device as it passes from one side of the sample to the other. For example, when using a path length of 0.8 cm., the optimum wavelength is about 5500° A. If the path length is increased, then the wave length should be increased accordingly. For example, a wavelength of 5750° A. would be used when the path length is increased to 1.0 cm., and a wavelength of 6000° A. would be used when the path is increased to 1.2 cm.

For example, wavelengths of about 2800° A. to about 7000° A. are very suitable in my process. In particular, a wavelength of 3700° A. can be used when iodine numbers of carbon black ranging from about 20 to 200 are to be determined using iodine solutions which are diluted to $\frac{1}{200}$ after adsorption. Also, a wavelength of about 5500° A. is most suitable when iodine numbers of carbon blacks ranging from about 20 to about 2000 are to be determined using the standard without dilution. Likewise, instead of using a single wavelength, it is permissible to employ a light having a substantial band spread of wavelength.

The light can be provided by use of a monochromatic source, an interference filter, a grating device, a prism, or a multi-light source instrument such as a spectrophotometer. Various commercially available spectrophotometers are the Coleman Junior II, the Cary 14, and the Spectronic 20.

Any light intensity determining device can be used in my process.

To determine the surface area, the transmittance or absorbance is compared to a standard.

To determine the iodine number of carbon black, the standard can be obtained by using carbon blacks of known iodine number and the standard (A.S.T.M.) iodine solution. It will of course be recognized that the procedures which are set forth below can employ any finely divided particulate solid matter and any solution of a light-absorbing material which is adsorbable by the solid matter.

For example, 1 gram of a carbon black having an iodine number greater than that of the sample to be determined, such as 150 $I_2$ number carbon black is added to 50 ml. of a standard $I_2$ solution in an adsorption bottle. The bottle is capped tightly and is shaken vigorously for about two minutes.

The mixture is filtered through glass fiber filter paper into a test tube to remove the carbon black from the mixture. A cuvette is filled with the filtrate.

The percent transmittance of the filtrate is then determined by use of the same device in which the determination for the carbon black of unknown iodine number is to be made such as a spectrophotometer. Of course, instead of the same device, another just like it can be employed.

The cuvette filled with the filtrate is inserted into a spectrophotometer and the percent transmittance is measured. The light wavelength used is 5500° A.

The point on the scale which will represent zero percent transmittance is calibrated by inserting a thick piece of opaque paper in the cuvette holder to block off all the light, and the galvanometer is set to line up with the zero percent transmittance point. To utilize the full scale of the spectrophotometer, the device can be calibrated so that the transmittance reading obtained with the 150 $I_2$ number carbon black falls near the upper end of the galvanometer scale.

Various other carbon blacks of known iodine number are used to obtain values of the percent transmittance as set forth above by employing the spectrophotometer which was calibrated as set forth above.

The data of percent transmittance versus iodine number is plotted to obtain the curve set forth below in FIG. 1 for a 0–150 scale.

Likewise a 0–60 scale and a 0–200 scale as set forth in FIG. 1 are obtained by calibrating the spectrophotometer so that the percent transmittance of the 60 $I_2$ number carbon black equals 100 percent for the 0–60 scale, and the percent transmittance of the 200 $I_2$ number carbon black equals 100 percent for the 0–200 scale.

Also, from these curves a permanent scale can be produced such as shown in FIG. 2.

It has further been found that instead of changing the scale from 0–150 scale, varying the weight of the sample in the solution according to the particular surface area being measured is very useful in obtaining the best results from the instrument used. The following is a list of the amount of finely divided particulate solid matter to be added to 50 ml. of solution for the various ranges of surface area of the solid matter:

| Grams per 50 ml. of solution: | Surface area |
|---|---|
| 0.5 | 135–200 |
| 1.0 | 80–135 |
| 2.0 | 40–80 |
| 3.0 | 0–40 |

When using a concentration other than 1.0, it is of course understood that the value obtained from the scale will have to be adjusted to obtain the actual value of the specific surface. For example, if a 0.5 gram per 50 ml. sample is used, the reading will be multiplied by 2 to get the actual value. Likewise, if a 2 grams per 50 ml. sample is used, the reading will be divided by 2 to get the actual value.

Likewise, instead of starting with carbon blacks of known surface area, the above standard or scales can be produced by preparing solutions with concentrations of the iodine which correspond to given iodine numbers, and these solutions are then used to obtain the data of percent transmittance versus iodine number. For example, to prepare a 150 $I_2$ number solution, 50 ml. of a standard A.S.T.M. $I_2$ solution and 50 ml. of KI solution (57 gm. KI/1 liter of solution) are admixed.

Another means of comparing the transmittance to a standard is by use of the formula:

$$\text{Surface area} = \frac{A_o - A_i}{A_o} \times K$$

where:

$$K = \frac{\text{number of mg. of iodine in solution}}{\text{mg. of the carbon black}}$$

$A_o$=absorbance of the solution before the addition of the carbon black;

$A_i$=the absorbance of the solution at some time, $t_i$, after addition of the carbon black (i.e. 2 minutes).

EXAMPLE I (A) Preparation of Standard (A.S.T.M.) $I_2$ Solution

Twelve grams of $I_2$ are added to 114 grams of KI, and sufficient water is added to dilute the mixture to 2 liters.

(B) Preparation of 150 $I_2$ Number Standard 50 ml. of the standard $I_2$ solution as prepared above is pipetted into an amber, wide-mouthed, 125 ml. adsorption bottle, and 50 ml. of a KI solution of 57 grams of KI in one liter of solution is added.

(C) $I_2$ Number Determination

A cuvette is filled with the 150 $I_2$ number standard, and it is inserted into the spectrophotometer containing the permanent scale shown and described hereinabove. The wavelength of the light is set to 5500° A. A thick piece of opaque paper is used to block off all the light, and the galvanometer is set to line up with the reference point (0% T.). The spectrophotometer is set to read 150 $I_2$ Number with this standard.

One gram of this carbon black is added to 50 ml. of a standard $I_2$ solution in an amber, wide-mounted 125 ml. adsorption bottle. The bottle is capped tightly and is shaken vigorously for about two minutes.

The mixture is filtered through 90 mm. glass fiber filter paper into a clean, dry 12 mm. x 70 mm. test tube to remove the carbon black from the mixture.

A cuvette is filled with the filtrate and is inserted into the spectrophotometer. The $I_2$ number is read directly from the scale prepared as discussed above. The $I_2$ number obtained by this method is ±2 as compared to an $I_2$ number obtained by the conventional A.S.T.M. procedure.

The following table shows resutls of ten determinations of $I_2$ number of loose blacks by A.S.T.M. procedure and by my spectrophotometric method as described above:

| A.S.T.M.: | Spec. method |
|---|---|
| 119.9 | 118.2 |
| 116.0 | 115.7 |
| 107.7 | 104.0 |
| 112.9 | 112.2 |
| 117.0 | 116.4 |
| 119.7 | 118.0 |
| 118.9 | 118.6 |
| 137.9 | 136.5 |
| 131.7 | 131.2 |
| 133.3 | 133.2 |

The following table shows results of $I_2$ number of pelletized control carbon blacks by A.S.T.M. procedure and by my spectrophotometric method as described above. The numbers listed for my method are averages over five determinations. Accuracy indicated is the standard deviation.

| | A.S.T.M. | Spectrophotometric method |
|---|---|---|
| SRF | 20.8, 21.7 | 20.2±1.4 |
| FEF | 42.7, 44.1 | 41.0±0.2 |
| HAF | 82.2, 83.6 | 81.4±1.1 |
| KSAF | 111.8, 115.2 | 111.5±0.5 |

Also averaging ten determinations of $I_2$ number of IRB–2 by my spectrophotometric method as described above yields a number of 80.4±0.9. Averaging 34 determinations by the standard procedure yields a number of 81.0±0.4.

What is claimed is:

1. A process for determining the surface area of finely divided particulate solid matter which comprises mixing a solution of a light-absorbing material which is adsorbable by the solid matter with the finely-divided particulate solid matter, adsorbing the material onto the particulate solid matter and thereby obtaining a partially depleted solution of the light-absorbing material, separating the particulate solid matter having the adsorbed material thereon from the partially depleted solution of the adsorbable material by filtering through a filter paper which does not appreciably sorb the light-absorbing material from solution, passing light through the depleted solution into a light intensity determining device, determining the transmittance of light through said depleted solution, and then comparing the transmittance to a standard to obtain the surface area.

2. The process of claim 1 wherein said finely divided particulate solid matter is carbon black.

3. The process of claim 1 wherein said finely divided particulate solid matter is asbestos.

4. The process of claim 1 wherein the solution is a standard (A.S.T.M.) iodine solution.

5. The process of claim 2 wherein the solution is a standard (A.S.T.M.) iodine solution.

6. The process of claim 1 wherein the light has a wavelength of about 2800° A. to 7000° A.

7. The process of claim 6 wherein said light has a wavelength of about 3700° A.

8. The process of claim 6 wherein said light has a wavelength of about 5500° A.

9. The process of claim 1 wherein the finely divided particulate solid matter is mixed with the solution in a ratio of about .500 gram to about 3.0 grams of solid matter per 50 ml. of solution.

10. The process of claim 1 wherein the finely divided particulate solid matter is mixed with the solution in a ratio of about 1 gram per 50 ml. of solution.

11. The process of claim 1 wherein the light intensity measuring device is a spectrophotometer.

12. The process of claim 1 wherein the filter paper is a glass fiber filter paper.

13. The process of claim 1 wherein said solution of a light-absorbing material is an aqueous solution which also contains a strong electrolyte.

14. The process of claim 13 wherein said electrolyte is present in an amount between about 10 parts and about 100 parts per 1000 parts of solution.

15. The process of claim 13 wherein said electrolyte is present in an amount between about 40 parts and about 60 parts per 1000 parts of solution.

16. The process of claim 13 wherein said strong electrolyte is potassium iodide.

17. The process of claim 14 wherein said electrolyte is potassium iodide.

18. The process of claim 15 wherein said electrolyte is potassium iodide.

19. A colorimetric process for determining the iodine number of carbon black which comprises mixing the carbon black with a standard (A.S.T.M.) solution of iodine in a ratio of about .5 gram to about 3.0 grams of carbon black per 50 ml. of solution, adsorbing the iodine onto the carbon black and thereby obtaining a partially depleted solution of the iodine, separating the carbon black having the iodine adsorbed thereon from the partially depleted solution of iodine by filtering through a filter paper which does not appreciably sorb the iodine from the solution, passing light through the partially depleted solution into a light intensity determining device, determining the percent transmittance of light through said depleted solution, and then comparing the percent transmittance to a standard to obtain the iodine number.

20. The colorimetric process of claim 19 wherein the carbon black is mixed with the solution in a ratio of about 1 gram per 50 ml. of solution.

21. The colormetric process of claim 19 wherein the light has a wavelength of about 2800° A. to about 7000° A.

22. The colorimetric process of claim 19 wherein the light has a wavelength of about 3700° A.

23. The colorimetric process of claim 19 wherein the light has a wavelength of about 5500° A.

24. The process of claim 19 wherein the filter paper is a glass fiber filter paper.

References Cited
UNITED STATES PATENTS 2,752,815   7/1956   Batchelor.

RONALD L. WIBERT, Primary Examiner

V. P. McGRAW, Assistant Examiner

U.S. Cl. X.R.

250—226; 356—74, 96